United States Patent [19]
Reynolds, Jr. et al.

[11] Patent Number: 5,110,035
[45] Date of Patent: May 5, 1992

[54] METHOD FOR IMPROVING THE SOLDERABILITY OF CORROSION RESISTANT HEAT EXCHANGE TUBING

[75] Inventors: Samuel D. Reynolds, Jr., Oviedo; Homer G. Hargrove, Maitland, both of Fla.

[73] Assignee: Westinghouse Electric Corp., Pittsburgh, Pa.

[21] Appl. No.: 473,556

[22] Filed: Feb. 1, 1990

[51] Int. Cl.⁵ .............................................. B23K 1/20
[52] U.S. Cl. ................................. 228/183; 228/209; 228/263.17; 228/263.21
[58] Field of Search .......... 228/208, 209, 183, 263.17, 228/263.21; 428/652, 658

[56] References Cited

U.S. PATENT DOCUMENTS

| | | | |
|---|---|---|---|
| 3,061,527 | 10/1962 | Karner et al. | 228/263.17 X |
| 3,132,928 | 5/1964 | Crooks et al. | 228/209 X |
| 3,393,447 | 7/1968 | Paul | 228/209 X |
| 3,949,122 | 4/1976 | Lepetit et al. | 228/209 X |
| 3,957,452 | 5/1976 | Schaer et al. | 428/650 |
| 3,991,929 | 11/1976 | Smith | 228/263.21 X |
| 4,615,952 | 10/1986 | Knoll | 228/183 X |

Primary Examiner—Kenneth J. Ramsey
Attorney, Agent, or Firm—K. Bach

[57] ABSTRACT

Methods for fabricating and repairing heat exchange tubing are provided including depositing an integral solderable coating onto a surface oxide of a tubular member and then soldering a plurality of spaced fins onto the integral solderable coating. The methods described herein provide economical techniques for fabricating heat exchange tubing suitable for use in extremely corrosive environments.

22 Claims, 1 Drawing Sheet

METHOD FOR IMPROVING THE SOLDERABILITY OF CORROSION RESISTANT HEAT EXCHANGE TUBING

FIELD OF THE INVENTION

This invention relates to improved heat exchange tubing for use in electrical generators and the like, and specifically, to procedures for improving the solderability of readily oxidized tubing materials.

BACKGROUND OF THE INVENTION

Heat exchange tubing is often used in connection with the production of electrical energy. This tubing often includes a plurality of fins for transferring the heat from a passing fluid in the interior of the tube into another fluid. Often, alloys having tenacious oxide coatings, such as aluminum or titanium, are used to make the tubing materials so that they can be used in corrosive environments, such as those found in gas-to-liquid heat exchangers, hydrogen or air coolers in electrical generators, or interstage coolers and compressors. Because of surface oxides, these corrosion-resistant alloys are very difficult to solder using standard techniques employing lead or tin-based soldering alloys. See for example, Young et al., U.S. Pat. No. 1,970,481, Hertz, U.S. Pat. No. 2,226,243, both of which are hereby incorporated by reference.

Although higher temperature welding techniques are known for their ability to penetrate tenacious oxide coatings, such techniques are inappropriate for relatively thin heat exchange tubing. Accordingly, a need exists for increasing the solderability of readily oxidized heat exchange tubing material, and thus, rendering such materials amenable to conventional soldering techniques.

SUMMARY OF THE INVENTION

This invention provides methods for fabricating or repairing heat exchange tubing, such as the type employed in connection with electric generators in power plants. This procedure deposits an integral solderable coating onto the surface oxide of a tubular member, which may contain, for example, aluminum or titanium. Upon this solderable coating is next placed a plurality of spaced fins to complete the heat exchange tubing. The tubes can be coated in advance with these solderable coatings, as well as other corrosion resistant coatings, and then stored indefinitely before soldering of the fins to the tubing.

Accordingly, a method of greatly improving the tubing material used for electrical generators is provided in which extremely corrosive resistant materials can be inexpensively soldered. In the preferred embodiments described herein, dip soldering and cascade soldering are employed in connection with aluminum and titanium tubes which have been electroplated with a layer of copper or nickel to improve their solderability. The resulting combination is both corrosion resistant on its inner diameter and weldable on its out diameter.

It is therefore an object of this invention to provide a method of improving the solderability of hard-to-solder heat exchange tubing;

It is another object of this invention to provide a method for coating heat exchange tubing prior to storage, whereby the outer diameter of such tubing is provided with a readily soldered surfacing for use in the later manufacture of heat exchangers.

With these and other objects in view, which will become apparent to one skilled in the art as the description proceeds, this invention resides in the novel construction, combination, arrangement of parts and methods substantially as hereinafter described and more particularly defined in the attached claims.

BRIEF DESCRIPTION OF THE DRAWINGS

The accompanying drawings illustrate a preferred embodiment of the invention for the practical application of the principles thereof, and in which.

DESCRIPTION OF THE INVENTION

In accordance with the teachings of this invention, methods for fabricating or repairing heat exchange tubing of the type employed in connection with electrical generators in power plants are provided. The methods include providing a tubular member including a surface oxide, depositing an integral solderable coating onto this surface oxide, and soldering a plurality of spaced fins onto the integral coating of the tubular member.

In a more detailed embodiment of this method, a tubular member including aluminum or titanium is provided which includes a surface oxide on its outer diameter surface. Onto this surface is plated a layer containing copper or nickel which substantially covers all of the surface oxide. Finally, a plurality of spaced fins are soldered onto the integral coating of the tubular member.

This invention also provides a heat exchanger, including a tubular member having a wall thickness of less than about 0.1 inches (2.5 mm) and consisting essentially of aluminum-bronze or a titanium-based alloy. The tubular member includes an electroplated coating of copper or nickel and a plurality of spaced fins soldered to the electroplated coating with a lead- or tin-based soldering alloy.

Figure 1:
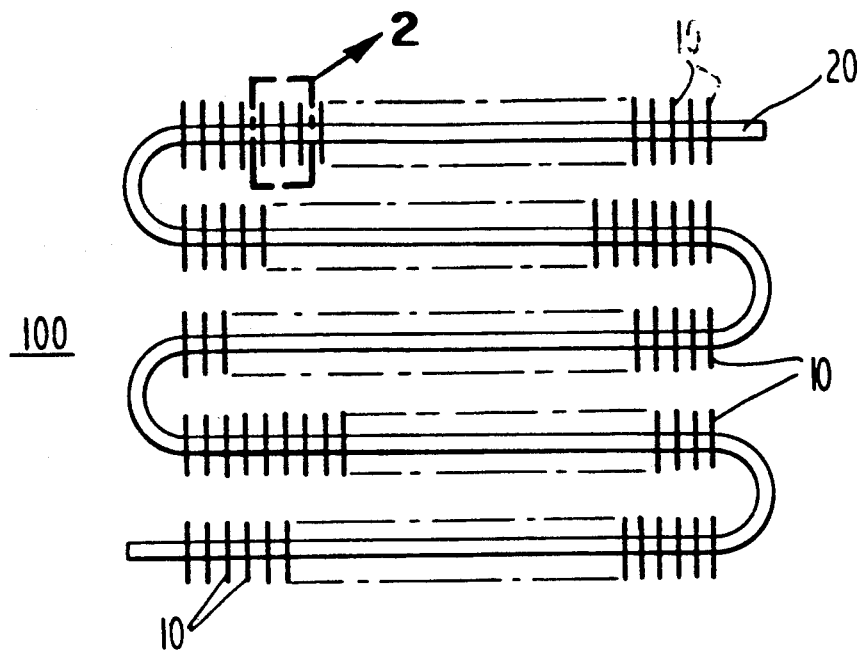
FIG. 1: is a planar view of a preferred finned, heat exchange tube of this invention.
Figure 2:
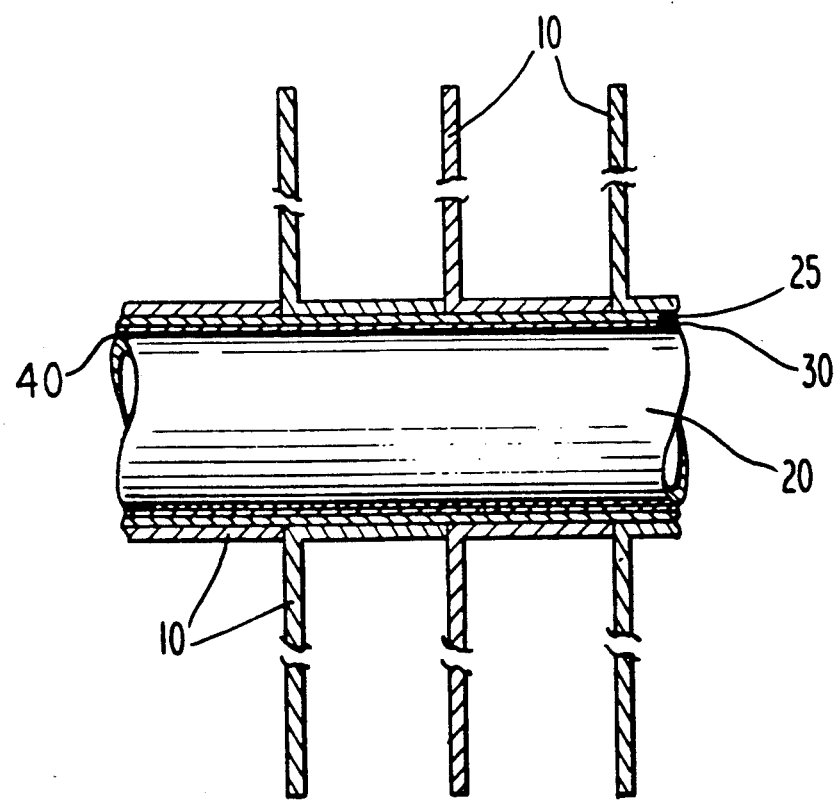
FIG. 2: is an enlarged cross-sectional view of a portion of the finned, heat exchange tubing of FIG. 1.

With reference to FIGS. 1 and 2, there is shown, the preferred finned heat exchange tubing of this invention. The heat exchange tubing 100 includes a tubular member 20 and spaced fins 10. The tubular member 20 of this invention preferably is corrosion resistant and can comprise metals having tenacious oxides, such as steel, aluminum, titanium, magnesium, or chromium. Such materials are rated "fair" to "difficult" in solderability. See ASM, Vol. 6, Welding, Brazing, and Soldering, *Metals Handbook*, 9th ed. pp. 1070–1082 (1983), which volume is hereby incorporated by reference in its entirety.

In accordance with properties required by the corrosion environment often employed in the production of electrical energy, aluminum, aluminum-bronze and titanium and its alloys are preferred metals for use in manufacturing the tubular member of this invention. Aluminum, however, forms a tenacious oxide layer upon exposure to air and is therefore difficult to solder. Titanium and its alloys are even more difficult to solder and cannot be joined directly by normal soldering techniques. However, such relatively thin tubing can be plated with a solderable metal, preferably one or more of tin, gold, cadmium, silver, palladium, rhodium, copper, bronze, brass, lead, nickel, and beryllium. More preferably, and with cost considerations in mind, copper or nickel are preferably electrolytically or electrolessly deposited onto the tenacious oxide layer of tubular member 20 in a fine integral solderable coating 30. Although, such plating techniques are conventional, see e.g. Vol. 6, *Metals Handbook*, supra, at 1075, such techniques have not been employed in connection with applying fins to extremely thin, corrosion resistance, heat exchange tubing.

The application of a copper electro-deposited layer onto an aluminum tube will now be discussed. Prior to depositing the copper, the tube should be thoroughly cleaned to remove grease, oil and other chemical impurities. Preferably, the tubing material is emerged in boiling trichloroethylene followed by passing it through cool trichloroethylene at about 90° F., 32° C. The tubing material can be subject to cathodic cleaning as well, by placing it in a solution having 200 g/l of sodium hydroxide and 20 g/l of trisodium phosphate operated at 140° F., 60° C., with a current density of about 27 amp/ft$^2$ (cathodic). The tubing can be held in this solution and subject to cathodic cleaning for about 30 seconds to 1 minute. Following cathodic cleaning, the tube can be given a zincating step for promoting good adhesion on the aluminum tubing. A single immersion coating in a solution containing sodium hydroxide, zinc oxide, sodium cyanide, cuprous cyanide, and nickelous cyanide provides a continuous and adherent coating 40 suitable for electroplating with copper from an alkaline strike solution. Copper strike plating can be performed employing a copper pyrophosphate bath with a current density of approximately 200–400 amp/ft$^2$ for a period of about 10–120 seconds. A subsequent copper fluoborate bath can be used as a final copper coating step and deposits can be applied at thicknesses above about 2 mils, 0.05 mm. Copper from a fluoborate solution can be deposited at current densities ranging from about 300–1000 amp/ft$^2$ to produce a plating which will generally resist cracks when the ductile tubing is mechanically deformed for various applications. Further reference is made to U.S. Pat. No. 3,957,452 by Schaer, et al., which is hereby incorporated by reference.

After the integral solderable coatings 30 has been provided on the tubular member 20, the coated tube can be placed into storage and held over a extended period of time prior to applying fins 10. It is known, for example, that certain aluminum alloys which contain copper are not very resistant to sea water or coastal environments. See ASM, Vol. 2, Properties and Selection, Nonferrous Alloys and Pure Metals, *Metals Handbook*, 9th ed., p. 224 (1979), which volume is hereby incorporated by reference in its entirety. Accordingly, alloys such as these, are preferably coated with nickel or copper prior to storage in order to avoid pitting of the tube material. Since it is known that copper can also experience atmospheric corrosion during storage, an additional coating of a soldering alloy can be applied to a copper coating prior to storage. Preferably such soldering alloys include lead or tin, and can facilitate the final application of heat exchange fins.

The fins 10 are preferably applied to the integral solderable coating disposed on the surface of the tubular member 20 employing an art recognized cascade or dip soldering process. See U.S. Pat. No. 4,634,044, which is hereby incorporated by reference.

Preferred soldering alloys suited to the principals of this invention include the following compositional ranges:

| Composition, % | | Temperature, °F. (°C.) | | |
|---|---|---|---|---|
| Tin | Lead | Solidus | Liquidus | Pasty range |
| 2 | 98 | 518 (270) | 594 (312) | 76 (24) |
| 5 | 95 | 518 (270) | 594 (312) | 76 (24) |
| 10 | 90 | 514 (268) | 570 (299) | 56 (13) |
| 15 | 85 | 440 (227) | 550 (288) | 110 (43) |
| 20 | 80 | 361 (183) | 531 (277) | 170 (77) |
| 25 | 75 | 361 (183) | 511 (266) | 150 (66) |
| 30 | 70 | 361 (183) | 491 (255) | 130 (54) |
| 35 | 65 | 361 (183) | 477 (247) | 116 (47) |
| 40 | 60 | 361 (183) | 460 (238) | 99 (37) |
| 45 | 55 | 361 (183) | 441 (227) | 80 (27) |
| 50 | 50 | 361 (183) | 421 (216) | 60 (16) |
| 60 | 40 | 361 (183) | 374 (190) | 13 (−11) |
| 63 | 37 | 361 (183) | 361 (183) | 0 (−18) |

Preferably, the soldering alloy 25 of this invention contains 50 weight percent tin and 50 weight percent lead, although 20 weight percent tin and 80 weight 10 percent lead and 90 weight percent tin and less than about weight percent silver could be beneficially employed Alternative solders which also would be suitable for use in this invention included: ASTM 95TA 95 weight percent tin, 5 weight percent antimony (which has been determined to reduce lead-compounds which are known contaminates in the water system of power plants); ASTM 96.5TS 96.5 weight percent tin, 3.5 weight percent silver and its varieties, lead-silver and lead-silver-tin solders and zinc-aluminum solder. It is further anticipated that other solderable mixtures known to those of ordinary skill can be employed with equally successful results.

The tubular member 20 of this invention preferably includes a Birmingham Wire Gauge (BWG) of about 22–16, and more preferably includes a BWG of about 18–20 The fins 10 of this invention preferably are wound onto the tubular member 20 and include a series of connected thin copper members having a thickness of about 13–15 mils, 0.33–0.38 mm, in a density of about 7–18 fins/inch, 2.76–7.09 fins/cm.

From the foregoing, it can be realized that this invention provides improved heat exchange tubing for use in connection with electrical generators and the like, in addition to an improved method of applying heat exchange fins onto tubing having tenacious oxide layers. Although various embodiments have been illustrated, this was for the purpose of describing, but not limiting the invention. Various modifications, which will become apparent to one skilled in the art, are within the scope of this invention described in the attached claims.

We claim:

1. A method of fabricating or repairing heat exchange tubing of the type employed in connection with electrical generators in power plants, comprising:

(a) providing a tubular member comprising a surface oxide;

(b) depositing an integral solderable coating onto said surface oxide; and, (c) soldering a plurality of spaced fins onto said integral solderable coating of said tubular member.

2. The method of claim 1 wherein said tubular member comprises: steel, aluminum, titanium, magnesium, or chromium.

3. The method of claim 2, wherein said soldering step (c) comprises applying an alloy containing about 50 wt. % tin and 50 wt. % lead.

4. The method of claim 1, wherein said integral solderable coating comprises: tin, gold, cadmium, silver, palladium, rhodium, copper, bronze, brass, lead, nickel, or beryllium.

5. The method of claim 4, wherein said soldering step (c) comprises applying an alloy greater than about 90 wt. % tin and less than about 10 wt. % silver.

6. The method of claim 1, wherein said integral solderable coating comprises copper or nickel.

7. The method of claim 6, wherein said depositing step (b) comprises electroplating said integral solderable coating onto said surface oxide.

8. The method of claim 7, wherein said soldering step (c) comprises applying an alloy containing about 20 wt. % tin and 80 wt. % lead.

9. The method of claim 7, wherein said tubular member has a wall thickness of less than about 0.1 inches (2.5 mm).

10. The method of claim 9, wherein said depositing step (b) comprises electroplating said integral solderable coating onto said tubular member during fabrication of said tubular member.

11. The method of claim 9, wherein said depositing step (b) applies said integral solderable coating onto said surface oxide of said tubular member within about 24 hours of the fabrication of said tubular member.

12. The method of claim 1, wherein said tubular member comprises aluminum or titanium.

13. The method of claim 12, wherein said tubular member consists essentially of aluminum bronze or a titanium-based alloy.

14. The method of claim 2, wherein said soldering step (c) comprises applying an alloy including lead or tin.

15. The method of claim 14 wherein said soldering step (c) comprises heating said tubular member and said integral solderable coating to about 100° F.-800° F., 38° C.-427° C.

16. The method of claim 15 wherein said soldering step (c) comprises cascade or dip soldering.

17. A method of fabricating or repairing heat exchange tubing of the type employed in combination with electrical generators in power plants, comprising:
(a) providing a tubular member comprising aluminum or titanium, said tubular member having a surface oxide on an outer diameter surface;
(b) plating a layer comprising copper or nickel onto said outer diameter surface over substantially all of said surface oxide; and
(c) soldering a plurality of spaced fins onto said integral coating of said tubular member.

18. The method of claim 17 wherein said soldering step comprises cascade or dip soldering.

19. The method of claim 17 wherein said plating step comprises electroplating.

20. A method of preparing heat exchange tubing for use in a subsequent soldering process, comprising:
(a) providing a tubular comprising aluminum, titanium, or a combination thereof; said tube having a tenacious oxide layer thereon;
(b) plating a uniform solderable coating comprising copper or nickel onto said oxide layer of said tube; and
(c) storage of said tube in an environment subject to atmospheric corrosion.

21. The method of claim 20 wherein said uniform solderable coating comprises copper, and said method further comprises soldering a uniform coating of a soldering alloy onto said uniform solderable coating prior to said storage step.

22. The method of claim 21 wherein said soldering alloy comprises lead or tin.

* * * * *